Figure 1:
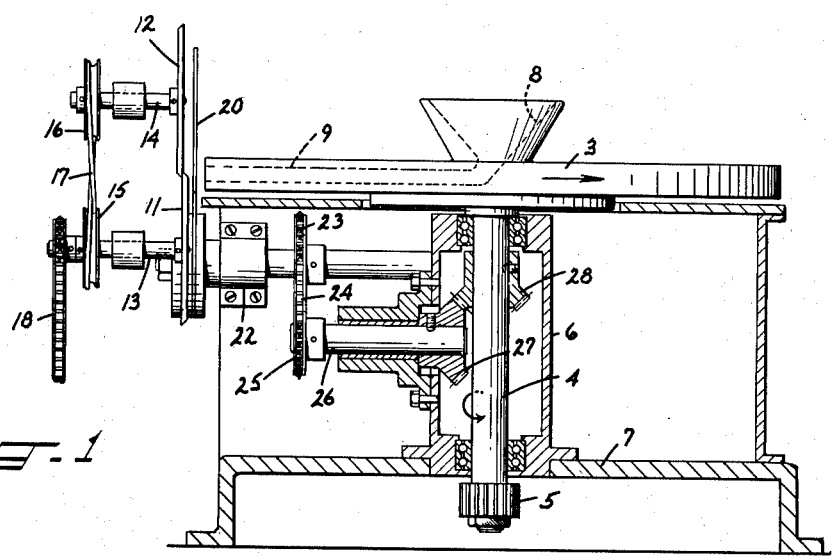

Nov. 27, 1951  E. K. BAUER  2,576,170
STAPLE FIBER CUTTER
Filed June 18, 1949

INVENTOR.
ERNEST K. BAUER
BY
Thomas R. Nally
ATTORNEY.

Patented Nov. 27, 1951

2,576,170

UNITED STATES PATENT OFFICE 2,576,170

STAPLE FIBER CUTTER

Ernest K. Bauer, Meadville, Pa., assignor to American Viscose Corporation, Wilmington, Del., a corporation of Delaware Application June 18, 1949, Serial No. 99,988

8 Claims. (Cl. 164—61)

This invention relates to a machine or device for cutting staple fiber from a bundle of continuous filaments.

The invention is particularly concerned with an improvement in a cutter of the type shown in Berla Patent 1,723,998 in which the continuous filamentary bundle is fed axially into a rotating disc or the like and proceeds through a radial passage which opens through the periphery of the disc and allows the leading end of the filamentary bundle to project therefrom into the path of a knife stationed adjacent the periphery of the cutter disc. In cutters of the type shown in the patent, the speed with which the continuous filamentary bundle proceeds to the cutting position depends largely upon centrifugal force and, though this may be somewhat aided by a fluid stream, such as of a jet of air, steam, or water, nevertheless the range of fiber length that can be obtained from such a cutter is somewhat limited. It is an object of the present invention to provide a simple modification by which the length of fiber cut under any given conditions of operation of the disc can be doubled, tripled, quadrupled or correspondingly increased in integral multiples. Other objects and advantages of the invention will be apparent from the drawing and the description thereof.

Figure 2:
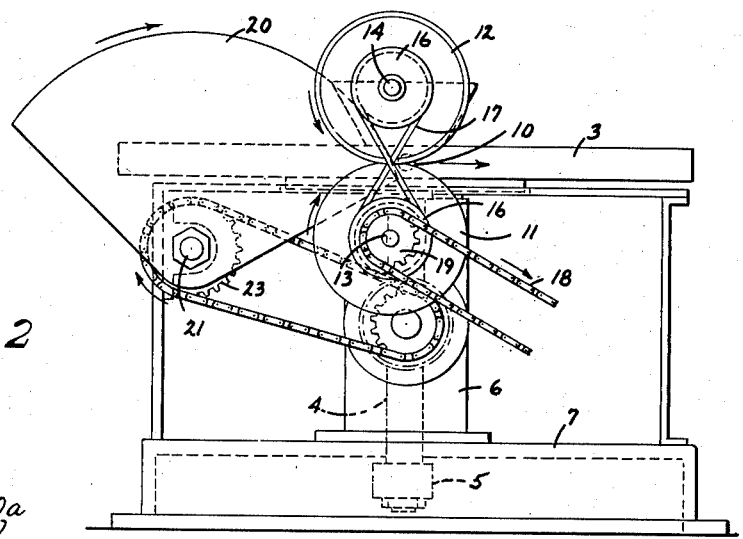
Figure 3:
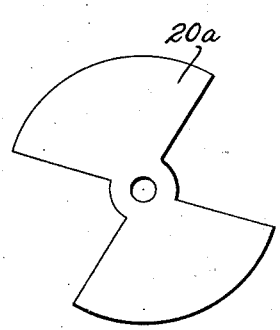

In the drawing, which is illustrative of the invention, Fig. 1 is a side elevation with parts in section, Fig. 2 is an elevation taken at right angles to that of Fig. 1, and Fig. 3 shows a modified shutter.

In general, the invention involves the interposition of a shutter between the periphery of the disc and a knife. The shutter may be a rotating sector (as in Figs. 1 and 2) or an apertured (that is, notched) disc (as in Fig. 3) rotating about an axis offset from the cutting position. By varying the relative size of the arc of the solid sector as compared to the open sector of the shutter, different lengths of fibers may be obtained as will appear hereinafter.

As shown, the cutter may take the form of a disc 3 which is fixedly mounted at one end of a shaft 4 which carries a gear 5 by which it may be driven through means not shown. The shaft is rotatably mounted in suitable thrust and radial bearings within a housing 6 carried on a supporting base 7. A funnel-shaped entrance or mouth 8 may be provided centrally of the disc 3 to facilitate the entrance of the filamentary material to be cut. The passage 8 communicates with a radial passage 9 which terminates in the opening 10 in the periphery of the disc 3. Adjacent the periphery of the disc there is provided a cutting means which, as shown, is preferably composed of a pair of rotating knives 11 and 12 carried on shafts 13 and 14 which carry pulleys 15 and 16 which serve to drive the knives in opposite directions by means of the cross-belt 17. A chain 18 drives a sprocket 19 on the shaft 13. The nip of the knives 11 and 12 is in alignment with the path of fibers protruding from the passage 9 of the disc 3. In order to prevent cutting of the filamentary material at every rotation of the disc when the opening 10 brings the filamentary material into the nip of the knives, a shutter device is provided which is specifically shown in the form of a rotating shutter 20 secured to a shaft 21 which extends through a bearing 22 and carries a sprocket 23 driven by chain 24 from the sprocket 25 fixedly mounted on shaft 26. The shaft 26 has fixedly mounted thereon a bevel gear 27 which meshes with a bevel gear 28 keyed to the shaft 4.

The frequency with which it is desired to cut the continuous filamentary material can be controlled by controlling the relative speed of the shutter 20 and the disc 3 and the relative proportions between the closed and opened portions or sectors of the shutter 20. If it is desired to prevent cutting in every other revolution of the disc 3 so that the fibers cut are twice as long as they would otherwise be under those conditions of operation, whether with or without a feed-assisting fluid stream, it is merely necessary to rotate the shutter 20 at half the angular velocity of the disc 3. In such operation, the closed angle of the shutter sector shown is far greater than it would have to be in order to prevent cutting on every other revolution of the disc. If the closed sector of shutter 20 merely amounted to approximately a 60° angle, it would still be effective in this system of operation. In order to obtain fibers three times as long as would normally be obtained if no shutter were employed, the closed sector of shutter 20 can be made to have an angle of approximately 240° leaving an open sector of approximately 120° and the speed of rotation of the shutter should be made one-third the speed of rotation of the disc 3 so that the open sector of the shutter would be in alignment with the discharge opening 10 of disc 3 only once in three revolutions of the disc. Corresponding changes to make fibers four or more times as long can be readily made. Thus, four times the length would be obtained with an open sector of the shutter of 90° and a speed of revolution of disc 3 four times that of the shutter 20.

The disc 3 rotates in the direction of the arrow and the shutter is disposed so that it overlaps the nip between knives 11 and 12 and extends to one side of such knives so that when the closed portion of the shutter overlaps the nip, the protruding ends of the fibers are brought against the sides of the shutter and thereby prevented from entering the nip of the knives.

It is to be understood that changes and variations may be made without departing from the spirit and scope of the invention as defined in the appended claims.

I claim:

1. A device for cutting continuous filamentary bundles comprising a rotatable member having an axial passage communicating with a radial passage for feeding the filamentary bundle radially therefrom, knife means spaced from the member and stationed adjacent the periphery of the rotatable member in the path of the filamentary bundle fed thereby, means for rotating the member, and shutter means for periodically obstructing the space between the periphery of the rotatable member and the knife means.

2. A device in accordance with claim 1 in which the shutter means comprises a rotatable shutter element having a closed portion and an open portion, and means is provided for driving the rotatable member at a speed which is an integral multiple of the speed of rotation of the shutter element.

3. A device in accordance with claim 2 in which the driving means for the shutter element is interconnected with that for the rotatable member.

4. A device in accordance with claim 3 in which the knife means comprises a pair of circular knives overlapping the adjacent edges to form a nip and means for rotating the knives in opposite directions.

5. A device in accordance with claim 4 in which the shutter element consists of a plate mounted for rotation on an axis perpendicular to its surface and having an opening or notch extending radially inwardly from the periphery of the plate.

6. A device in accordance with claim 5 in which the closed portion of the plate has an angle of at least approximately 60°.

7. A device in accordance with claim 4 in which the shutter element consists of a sector plate mounted for rotation about an axis perpendicular to the surface of the plate.

8. A device for cutting continuous filamentary bundles comprising a rotatable member for feeding the filamentary bundle radially therefrom, an axial passage in the member for guiding the bundle therethrough and having a discharge opening in the periphery of the member, knife means spaced from the member and stationed adjacent thereto, in the path of the filamentary bundle fed from the opening, means for rotating the member, and shutter means for periodically obstructing the space between the periphery of the rotatable member and the knife means.

ERNEST K. BAUER.

REFERENCES CITED

The following references are of record in the file of this patent:

UNITED STATES PATENTS

| Number | Name | Date |
|---|---|---|
| 126,179 | Bunker | Apr. 30, 1872 |
| 1,979,227 | Kierspe | Oct. 30, 1934 |
| 2,228,945 | Maton | Jan. 14, 1941 |